United States Patent [19]

Spence-Bate

[11] 4,015,901
[45] Apr. 5, 1977

[54] PHOTOGRAPHIC FILM POSITIONING MECHANISM

[76] Inventor: Harry Arthur Hele Spence-Bate, 115 Cheam Place, Morley, Australia, 6062

[22] Filed: June 13, 1975

[21] Appl. No.: 586,656

[30] Foreign Application Priority Data

July 4, 1974 Australia .................... 70860/74

[52] U.S. Cl. ................. 355/53; 74/567; 353/27 R; 354/195; 355/58
[51] Int. Cl.² ........................................ G03B 27/42
[58] Field of Search ........... 354/195, 197; 74/567; 352/188; 355/53, 55–59, 61, 62; 353/27

[56] References Cited
UNITED STATES PATENTS

| | | | |
|---|---|---|---|
| 2,506,347 | 5/1950 | Davis | 355/58 |
| 3,208,338 | 9/1965 | Davis | 355/59 |
| 3,628,865 | 12/1971 | Spence-Bate | 355/53 |

Primary Examiner—Richard A. Wintercorn
Attorney, Agent, or Firm—Fidelman, Wolffe & Waldron

[57] ABSTRACT

A positioning mechanism primarily but not exclusively for positioning a microfiche film held in a movable frame relative to a camera lens or to pick-up, transfer, titling and release stations where a high degree of accuracy is required, comprising one or more camways formed helically around a cylindrical roller, a cam follower on the frame engaging one of the camways which frame is then driven to a location on the camway by rotating the roller, at the location a depression in the camway formed either as a hole or ramp acts as a stop for the follower, the stopping surface of the depression is provided along the length of the camway so that if the follower which is in contact with both sides of the camway or the camway itself becomes worn at the sides the location position is not subjected to wear and the accuracy of the location of the follower in the depression is not affected. Several microfiche standards can be accommodated on one roller by the provision of several camway grooves and the follower can be made to more rapidly form one standard to another by linking the camways and/or by lifting the follower from one groove to another.

28 Claims, 16 Drawing Figures

PHOTOGRAPHIC FILM POSITIONING MECHANISM

The present invention relates to a photographic film positioning mechanism.

In U.S. Pat. No. 3,628,865 (Spence-Bate et al) there is described a positioning mechanism primarily intended for step and repeat cameras. Such a mechanism depends on the use of a helical groove, i.e. a lead screw, on a cam-roller or drum and a groove follower driving a film holder. On rotating the drum in one direction, the film holder is driven in a direction parallel to the axis of the drum. On reversing the direction of rotation of the drum, the groove follower is driven back down the groove until it engages in a notch formed in the groove. The engagement of the groove follower is ensured by its tip moving across the groove due to the groove being much wider than the tip. Such notch construction combined with a narrow tip and groove causes several problems. Firstly the necessary 'slop' of the mechanism causes stresses when the tip changes sides of the grooves, and there is therefore, so to speak, a no man's land. These stresses cause wear on the tip and groove which in turn cause inaccuracy of location and 'jolting' of the mechanism. Furthermore the switching and stop cams and associated electrical circuitry is complex and can be difficult.

One object of the present invention is to reduce or overcome the above disadvantages. Another object is to further simplify the machining of the drum.

The present invention consists in a photographic film locating mechanism comprising a film holder driven by a groove follower connected to the holder, a drum on which are formed one or more helical grooves, in the bottom of the or each groove there being holes for locating the film holder at a required position, said groove and follower being substantially the same width.

A further object is to provide a new multi-standard device and a groove and locating means requiring less space. To this further object it is advantageous to have a locating mechanism as described above with more than one groove linked together at their ends. In this case each groove could be used for a different standard, e.g. when the film holder had to stop at say twice the number or other differential of stops than the basic standard, said holes would be provided at different distances. There are at present at least four major standards, N.M.A. (single double), COSATI (single double), N.N.A. COM and MINICATS. Other standards are also being considered. It is for this multiplicity of standards that the multi groove mechanism is especially advantageous.

In one embodiment of the invention the holes in the grooves are formed with a circular cross-section having a diameter approximately the same as the width of the groove.

To ensure that the locating accuracy of the follower is retained after the mechanism has been subjected to considerable use it is advantageous to provide the follower with a cylindrical portion of greater diameter than a cylindrical portion forming the portion of the follower which follows the groove and enters the holes in the bottom of the or each groove, the cylindrical portion of greater diameter would fit into a hole of similar diameter formed into the groove.

To ensure fast transfer and disengagement the follower's depth in the groove can be varied; this is achieved simply by a solenoid operated plunger. The selection of a standard will become clear with reference to the accompanying drawings. The angular inclination of the groove in relationship to the rotating drum imparts a bias which is overcome by the deep groove. In a second embodiment of the invention the or each groove has ramp shaped ledges which form the holes in the groove, the ledges sloping in a ramp like fashion longitudinally from the bottom of the groove to toward the top of the groove on one side, whilst on the other side a sheer locating face is provided.

The invention will now be described with reference to the accompanying drawings in which:

FIG. 6 shows a diagram of a drum according to an embodiment of the invention having a four start thread, FIG. 7 is a diagrammatic end view of FIG. 6, FIG. 8 continued to FIG. 8a, 8b and 8c show diagrammatically the locations of holes formed by ramps in the helical grooves of the drum shown in FIG. 6, the holes being arranged for four differing standards.

Figures 1, 2, 3:
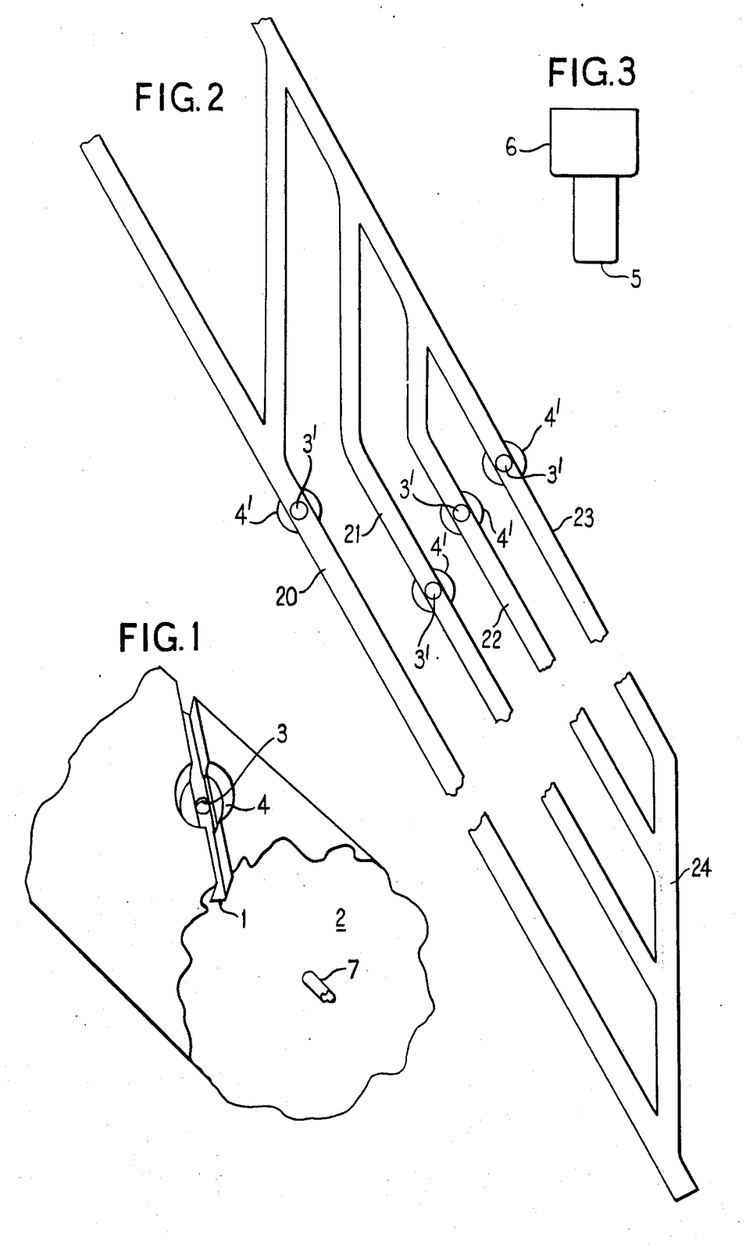
FIG. 1 shows a portion of a drum with a helical groove according to the invention.
FIG. 2 shows part of a multi standard set of grooves showing parallel grooves opened out to show the groove arrangement according to the invention.
FIG. 3 shows the tip of the groove follower according to the invention.

The general arrangement of film holder as driven by the groove follower shown in FIG. 3 is not shown since the general arrangement is essentially the same as U.S. Pat. No. 3,628,865 (Spence-Bate et al). The differences reside in the formation of the grooves and groove follower.

In FIG. 1 may be seen part of one of the grooves 1 on a drum 2. The groove has a hole 3 the width of the groove and circular milled away portion 4. The hole 3 and cut away portion 4 are such that a cam follower of the shape shown in FIG. 3 can drop or be forced down by a spring into the hole from a level where the bottom 5 of the cam follower rides along the bottom of the groove 1 to a lower level. The drop in level of the follower then switches off the drive to the drum 2 which then stops and locks in a programmed position.

The cam follower as shown in FIG. 3 has a tip 5 and portion 6 of enlarged diameter which fits the portion 4 on the drum. It can be appreciated that whilst wear can take place between the tip 5 of the follower and the groove 1 due to constant driving of the follower, the only time when wear on the surfaces of the portions 4 and 6 takes place is when engagement is required. Therefore the accuracy of the engagement position can be retained even when continuous use of the mechanism has worn the groove and/or tip of the follower.

In the mechanism any suitable means can be provided such as a spring between the drive shaft 7 and the drum 2 for cushioning the stop of the drum when locked by the engagement of the tip of the follower in the hole 3.

In order to accommodate different standards, for instance BS 4187, 1967, which requires a density of 72 images per microfiche whilst the N.M.A. standard recommends 112 per microfiche, the arrangement of FIG. 2 is provided. In this arrangement four programmed instrument guide grooves 20, 21 22 and 23 are provided each having holes 3' and cut away portions 4'. The guide grooves 20 . . 23 are joined by a groove 24. When the groove follower reaches the end of its guide groove the drum is reversed and a solenoid (not shown) ensures the tip of the follower does not drop into a hole, thus enabling the follower to return up any groove.

Figure 4:
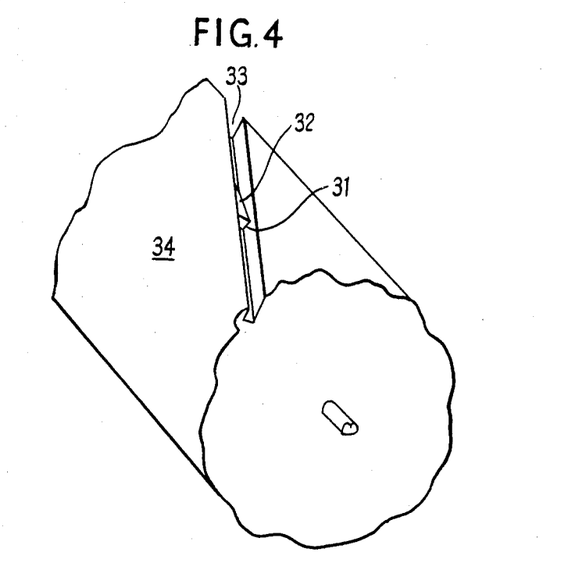
FIG. 4 shows a portion of a drum with a helical groove with a ramp shaped projection in the groove in a second embodiment according to the invention.
Figure 5:
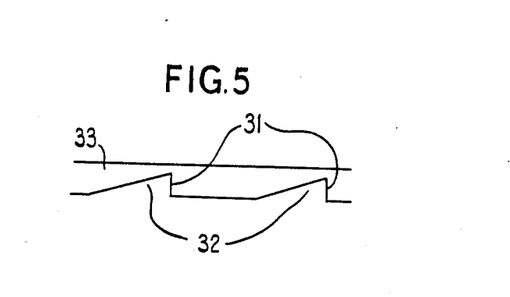
FIG. 5 shows a side view of the groove of FIG. 4 to show the ramp shaped projections in the groove.

In a second embodiment shown in FIGS. 4 and 5 the holes 3 and cut away portions 4 of the first embodiment are replaced by sheer locating faces 31 on ramps 32 in the grooves 33 in the drum or roller 34. The ramps 32 have a gradual incline on one side and a steep or sheer drop on the other. A spring loaded or solenoid operated plunger can ride up the gradiant by means of the appropriate rotary movement of the roller, and by continued rotary action the plunger is allowed to fall off the steep end of the ramp thus initiating a reversal which locates the plunger firmly against this face which is so placed to constitute a stop. This stop has been so placed as to act as a location point for positioning purposes. In an alternative construction a location read Photo Darlington or similar photo sensor can initiate this reversal. Ramps are placed all along the groove as required. These ramps of course only go partially up the groove so that the plunger cannot disengage itself from the cam roller groove. In other words the plunger falls off the steep side of the ramp which secures accurate location. The highest part of the ramp is always below the level of the roller thus ensuring a continuous helix.

A solenoid operated plunger not only allows a general reversal to take place but also allows a fast smooth forward action to take place if this is required or easy repositioning into an alternative groove which can be programmed differently, i.e. the location ramps are placed at different intervals thus changing the location or positioning pattern.

The number of images and their size on each laminae depends on the standard being used and for example the BS 4187:1967 requires a density of 72 images while the N.M.A. standard recommends 112 per sheet.

Figure 13:
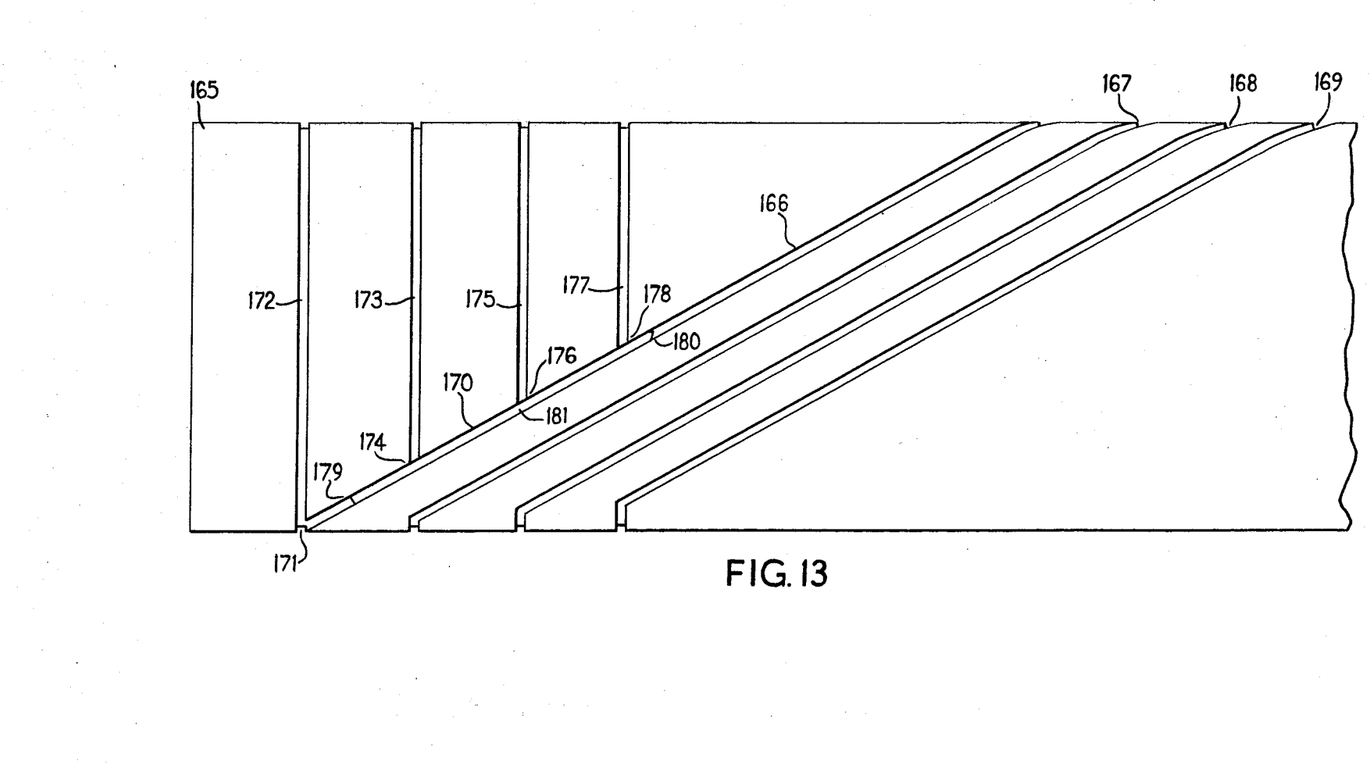
FIG. 13 is a further type of drum having a modified groove formation.

The drum or roller can have a large number of grooves arranged in the form of a multi-start thread each individual thread accommodating a separate ramp programme as shown in FIG. 2. The solenoid operated plunger allows easy transfer from one thread to another. Alternatively the threads can be connected to form a closed loop and the desired groove selected in this manner. Alternatively a drum as shown in FIG. 13 may be used this will be described subsequently. The second frame is driven relatively to the first by a second cam roller mounted upon the first frame and again driven by a second servo motor and a second cam follower is mounted on the second frame. The final frame is provided with a film base plate, the underneath surface of which has a plurality of apertures which are connected for example to a vaccum line so that a sheet of film may be held in flat condition underneath the plate. With a roller of a diameter of over an inch, three revolutions at a helix angle of 60° with relationship with the cam roller axis will cover the entire length of a standard-microfiche lamina which is a nominal 6 inches (148 mm). The above is a useful size but any dimensions can be used. A smaller cam roller will increase the number of revolutions necessary to cover the length of a sheet of film. This makes the control device more crowded, while a larger diameter cam roller has the opposite effect.

A smaller cam roller will necessitate an increased number of revolutions necessary to cover the length of a sheet of film.

The larger the drum or cam roller is made the more programmes are wanted the cam roller would become somewhat unwieldy. In this case it is better to have a reasonable sized cam roller 1¼ inches or thereabouts, with not more than six programmes on it, and exchange same if more programmes are required.

In an alternative embodiment the spacing of the ramps of the rollers are mechanically adjustable. By rotating sleeves or cylinders relatively to each other, ramps or pins can be moved and thus the standard changed, but as the mechanics of this is more complex, it is generally cheaper to cut additional camways to provide the means for multi-standard work. This has already been described earlier.

Another relatively simple mechanical embodiment provides pins for all the standards required and only those pins are pushed out into the roller cam groove which are appropriate to the standard that is at any time in use. The change of standard merely requires the withdrawal of one set of pins and substituting an alternative set of pins or other arrester.

In an alternative embodiment which is not so compact, independent and unconnected grooves are provided on a drum and arrangements are provided for lifting the follower out of one groove into the selected groove. Clearly once engagement between the follower and groove is lost, supplementary driving means and/or location means have to be used.

With reference to FIGS. 6 to 12 further detail of rack or ramp grooved drums will now be explained, FIGS. 6 to 8c being explanatory of the precise locations for the grooves and holes formed by the ramps. It should be noted at this stage that the locations for the holes in this third embodiment of the invention are equally applicable to the holes of the first embodiment shown in FIGS. 1 and 2.

Figures 6, 7, 8:
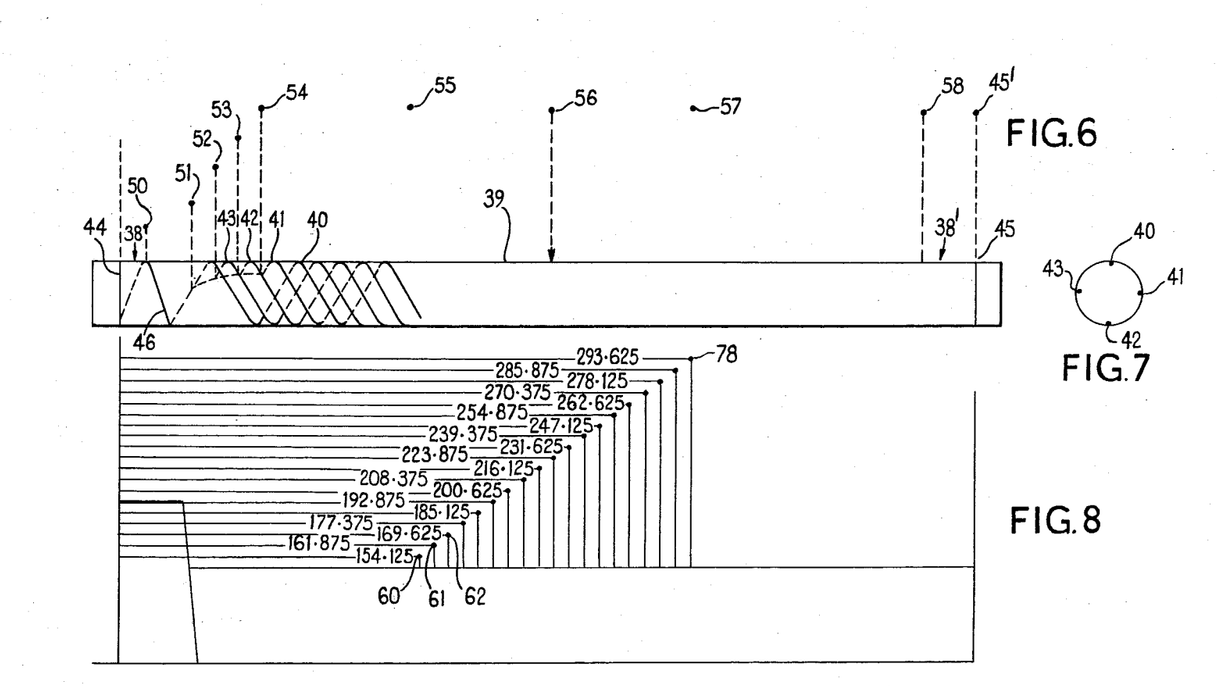

In FIGS. 6 and 7 there is shown a drum 39 with a four start thread provided for the MINICAT Standard (48 times reduction) at first standard groove 40 for the N.M.A. COM Standard at second standard groove 41, for the COSATI Single and Double Standard at third standard groove 42, and for the N.M.A. Single and Double Standard at fourth standard groove 43. Each of these standard grooves 40, 41, 42 and 43 start from a lead groove 46 which in turn is connected to a circumferential safety groove 44 at one end. At the other end of the drum a similar arrangement is provided. The connections from the standard grooves to the read groove and safety groove are shown in more detail in FIG. 9 though in this figure the ramp locations are only representative and are not accurately shown.

Referring back to FIG. 6 various primary ramp locations on the drum are indicated above the drum. Thus 14 mm from the safety groove a first ramp location 50 for a microfiche pick-up position is provided on the lead groove 46. At location 51 a second ramp location 39 mm from the safety groove is provided at the junction between the first standard groove 40 and the lead groove 46. Thereafter at 12 mm intervals third, fourth and fifth ramp locations, 52, 53, and 54 are provided, the fifth ramp location being at 75 mm from the safety groove, locations 55 and 57 are "short travel limits" over which most of the filming is carried out.

Figure 8A:
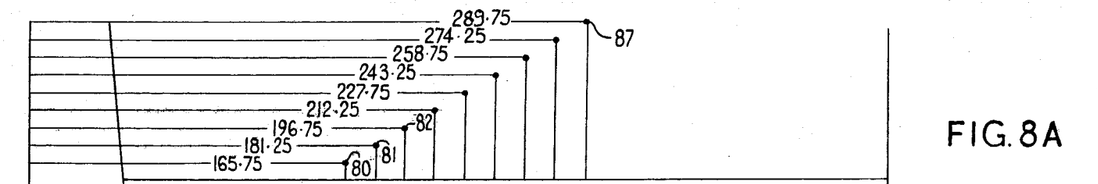
Figure 8B:
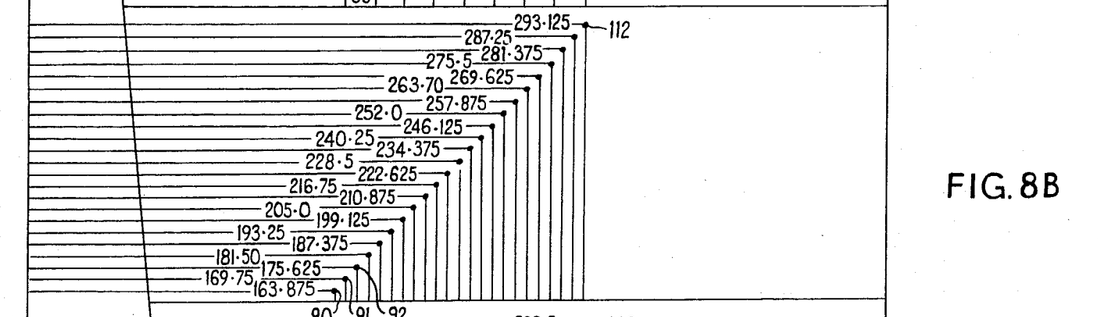
Figure 8C:
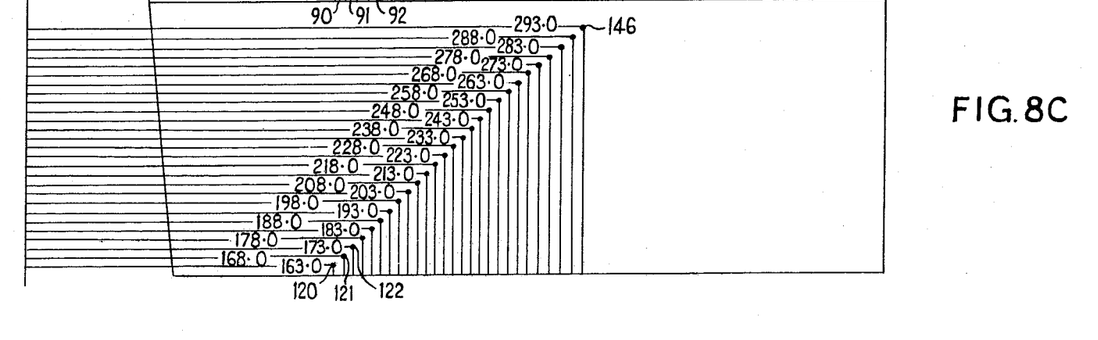

Ramps for locating the microfiche in the four standards indicated relative to a camera lens at individual frame positions are indicated in FIGS. 8 to 8c. The camera lens is located at position 56.228 mm from the safety groove. The drum 39 is also provided with a titler location 58 at the end nearest the second safety groove 45. The titler location 58 being provided at 442 mm from the safety groove 44 on a second lead groove (not shown) similar to lead groove 46. The second safety groove 45 at location 45' is 456 mm from groove 44. Arrangements for reversing the drum are located at 38 and 38'.

In FIG. 8 there are shown the ramp locations for the MINICAT (48 times reduction) Standard on standard groove 40. Thus the first frame ramp of this standard is at 60, 154.125 mm from the safety groove 44 and the second at 61, 161.875 mm from the groove 44 and subsequent ramps at 62 and so on at 7.75 mm intervals to location 78 at 293.625 mm from groove 44.

In FIG. 8a there are shown the ramp locations for the N.M.A. COM Standard on standard groove 41. Thus the first frame of this standard is at 80, 165.75 mm from the safety groove 44 and the second at 81, 181.25 mm from groove 44 and subsequent ramps at 82 and so on at 15.50 mm intervals to location 87 at 289.75 mm from groove 44.

In FIG. 8c there are shown the ramp locations for the COSATI Single and Double Standard on standard groove 42. Thus the first frame of this standard is at 90, 163.875 mm from the safety groove 44 and the second at 91, 169.75 mm from groove 44 and subsequent ramps at 92 and so on at 5.875 mm intervals to location 112 at 293.125 mm from groove 444.

In FIG. 8c there are shown the ramp locations for N.M.A. Single and Double Standard on standard groove 43. Thus the first frame of this standard is at 120, 163.0 mm from the safety groove 44 and the second at 121, 168.0 mm from groove 44 and subsequent ramps at 122 at 5.0 mm intervals to location 146 at 293.0 mm from groove 44.

Single and double fiche standards enable the shifting of the optical axis which in practice means that for example two pages of a book can be photographed simultaneously.

Figure 9:
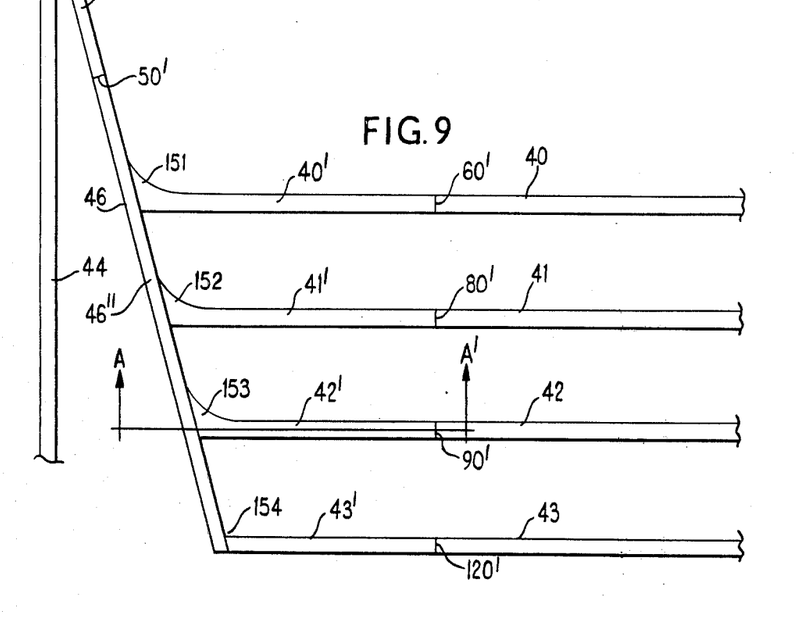
FIG. 9 shows part of a multi-standard set of grooves of the third embodiment shown in FIG. 6 showing the grooves opened out.
Figure 10:
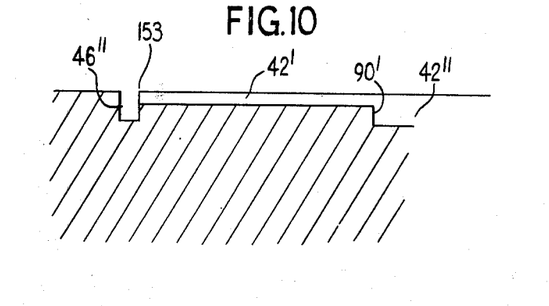
FIG. 10 is a cross-section taken along the line AA$^1$ of FIG. 9 showing one type of ramp.

The particular form of the safety grooves 44; lead 46 and standard grooves 40 to 43 and the ramps will now be described with reference to FIGS. 9 and 10. In FIG. 10 there can be seen that there are shallow and deep grooves. Thus safety groove 44 is shallow and joins at junction 150 a shallow portion 46' of lead groove 46. Lead groove 46 is shallow up to pick-up ramp 50' where it drops to a deep portion 46". At junctions 151, 152, 153 and 154 the deep portion 46" of lead groove 46 meets shallow portions 40', 41', 42' and 43' respectively of standard grooves 40, 41, 42 and 43. The shallow portions of the standard grooves continue to the first frame ramps 60', 80', 90' and 120' of grooves 40, 41, 42 and 43 respectively, where the grooves then become deep. In FIG. 10 showing a portion of standard groove 42 there can be seen the deep portion 46" of lead groove 46 joining at junction 153 the shallow portion 42' of standard groove 42. The shallow portion 42' continues to ramp 90' and then drops to deep portion 42".

Figure 11:
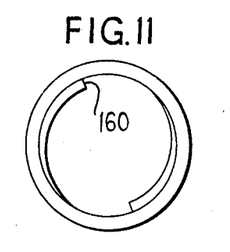
FIG. 11 is a cross-section of a drum according to the invention showing the formation of a further type of ramp.
Figure 12:
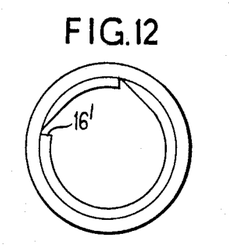
FIG. 12 is a cross-section of a drum according to the invention showing yet a further type of ramp.

It should be noted that the grooves can also rise from deep to shallow portions which is shown in two embodiments in FIGS. 11 and 12 where cross-sections of ramps 160 and 161 are shown. The ramp 161 is of similar construction to ramp 32 shown in FIG. 4 and 5.

In the fourth embodiment of the drum 165 shown in FIG. 13 four standard grooves 166, 167, 168 and 169 are provided. The first standard groove 166 is for the most used standard and leads directly from and with the same pitch as a lead groove 170. Lead groove 170 in turn connects at junction 171 with a circumferential safety groove 172. Standard groove 167 connects via a circumferential groove 173 with lead groove 170 at junction 174; standard groove 168 connects via a circumferential groove 175 with lead groove 170 at junction 176; and standard groove 169 connects via a circumferential groove 177 with lead groove 170 at junction 178. In a similar arrangement to that shown in FIG. 9 the standard grooves 166–169 safety groove 172 and circumferential grooves 173, 175 and 177 are all of a shallow depth whilst lead groove 170 is deep in a deep section 181 from step 179 to ramp 180. Junctions 174, 176 and 178 have steps from the deep lead groove 170 to the shallow circumferential grooves 173, 175 and 177. The operation of these grooves is such that once the follower pin 5 is in a standard groove, the follower reciprocates in the selected standard groove. Only when a change of standard or when at the pick-up station does the follower engage in the deep section 181 of the lead groove 170. On facing the appropriate circumferential groove 173, 175 or 177 the follower is lifted by a solenoid to the height of the selected shallow groove and the follower enters this. The standard grooves have ramps as previously described for locating the follower at a required filming station. The safety groove 172 allows the drum to rotate without damage to the drive motor or gear box if the follower runs its travel for any reason. The normal limit for the follower is at step 179. The follower is spring loaded so as to urge it into the centre of the drum and when entering the deep section 181 it is urged into the bottom of the groove unless lifted into a station mode for changing standards. When the follower reaches the end limit at 179, the drum reverses and the follower stays in the deep position until just before the desired circumferential groove is reached.

The operation of drums 39 (FIG. 6) and drum 165 (FIG. 13) when used in a microfiche camera are generally similar to that of the drums 2 and 34 of the first and second embodiments. Thus a microfiche carrier with a cam follower formed as a pin is provided, the cam follower engaging in a groove in the drum. The carrier is arranged to move along slides, rails or round bars in a direction normally parallel to the drum axis in a similar manner to that shown in U.S. Pat. No. 3,628,865. Rotation of the drum driver by a motor causes the carrier to be driven along the slides by the camming action of the appropriate groove on the drum acting on the cam follower. Two drums set at right angles can be arranged to move the carrier in an X and Y direction so as to locate a microfiche held on the carrier in one of a number of pre-arranged standard positions such as frame positions pick-up positions and titler positions. These positions as explained above are set by the providing of depressions or holes formed by the ramps in the grooves. A face on each ramp generally normal to the drum surface provides the accurate location face for each pre-arranged standard position. The drum is then operated in the way described previously with reference to the second embodiment so that be reversal of the drum the cam follower is engaged accurately with the ramp face.

With reference to the drums it is convenient to provide quick release clips at each end similar to those used on typewriters. With this provision it is then easy to remove the drum and replace it with a drum having different ramp patterns for different standards formed thereon. In this way one microfiche camera can easily be used for a large number of differing microfiche standards and if necessary a customer can make up his own standard and can easily have a suitable drum for this.

Another advantage of the drum is that no friction and little wear on the locating faces of the cam followers, which can be provided with a flat ramp engaging surface to avoid point contact with the ramp face. Also there is little or no wear on the ramp face which ensures continued accurate positioning. Even in the event of wear or other damage it is by the quick release means already described easy to replace a damaged drum.

With reference to the cam follower, this can be withdrawn from ramp level and the drum reversed therefore no return grooves is ncessary. This facility is important when updating microfiches or for use with "Complementary Microfiche" which is the subject of separate patent application by the inventor.

As regards the drum grooves, these can be ramped in opposite directions so as to allow for photographing in a square wave pattern thus speeding up the action considerably since no unused return runs have to be made. Groove to groove transfer grooves can also be provided to allow for mixed standard and programmes.

The drum drive can be provided if required with a cushioning means such as a spring between the drive shaft and drum which allows for drum deacceleration and reduces the stress of engagement.

It will be appreciated that multi standard grooved drums enable two or more standards to be recorded on one microfiche for example the top half of the microfiche can have large diagrams A2 whilst the bottom half can have text in a different smaller size say A4.

Whereas this invention has been described with reference to use in a Microfiche camera it will be appreciated that, the positioning mechanism formed by drum, groove and hole, depression or ramp can be readily applied to other applications particularly those where a grid or row and column has to be located. Such an application might be for a map reference location device or an indexing or calculating device. The invention is generally applicable to information retrieval and applications could be considered for use with machine tools for repetition work.

Having now described the invention I claim:

1. A positioning mechanism comprising a frame, a carrier element mounted for forward and reverse movement along a linear path, said element being connected to a cam follower,
a cylindrical positioning means mounted for rotational movement on said frame, the positioning means having an axis of rotation substantially parallel with said path,
at least one helical first groove defining a camway formed on the positioning means, said cam follower having a first engagement portion of a width substantially that of the camway,
at least one depression in said camway into which the follower is adapted to be received, said cam follower being adapted for movement forward or away from the said axis of rotation of the positioning means into or out of the depression,
whereby said carrier element is located in a predetermined position without lateral movement of said follower in said depression.

2. The mechanism of claim 1 wherein said depression is formed by a hole in said camway of a depth greater than the depth of the camway, the hole being of approximately the same width as the camway.

3. The mechanism of claim 2 wherein said hole in the camway is provided with curved walls whose center of curvature is that of the said hole, the cam follower being formed with a second engagement portion, the first and second arrangement portion being adapted to engage in the hole and with the curved walls respectively and wherein the second engagement portion is of greater diameter than the first engagement portion.

4. The mechanism of claim 3 wherein there are provided at least two said first grooves defining camways, each groove formed with a plurality of holes, each groove being linked to each other by at least one further groove.

5. The mechanism of claim 4 wherein the said first grooves are of similar pitch and two or more said further grooves are provided as lead grooves at least at each end of the said first grooves said lead grooves being of a different pitch to said first grooves.

6. The mechanism of claim 5 wherein each said lead grooves leads from the first grooves to a safety groove formed at each end of the positioning means as a continuous circumferential groove around the said positioning means.

7. The mechanism of claim 4 wherein a motor drive is connected to said positioning means via a resilient means.

8. The mechanism of claim 1 wherein said depression is formed on one side by a locating face whose surface is substantially normal to the axis of rotation of the positioning means, the depression being formed on two other sides by inward extension of the groove walls, whereby a ramp is formed in the groove.

9. The mechanism of claim 8 wherein there are provided at least two said first grooves, each groove formed with a plurality of ramps, each groove being linked to each other by at least one further groove.

10. The mechanism of claim 9 wherein said first grooves are of similar pitch and two or more said further grooves are provided as lead grooves at least at each end of the said first grooves, said lead grooves being of a different pitch to said first grooves.

11. The mechanism of claim 10 wherein each said lead groove leads from the first grooves to a safety groove formed at each end of the positioning means as a continuous circumferential groove around the said positioning means.

12. The mechanism of claim 9 wherein a motor drive is connected to said positioning means via a resilient means.

13. A microfiche camera having the positioning mechanism of claim 1 wherein the carrier element is adapted to carry a microfiche, wherein the said first groove is connected to a safety groove at each end of the positioning means, said safety groove being formed as a circumferential endless groove.

14. The camera of claim 13 wherein two or more said first grooves are provided and are connected at each end of the positioning means to a said safety groove via a lead groove.

15. The camera of claim 14 wherein a said depression if formed on a first said lead groove acting as a film pick-up locating means, and wherein there is provided film storage means adjacent said pick-up locating means, and means for transferring a film from the storage means to the film carrier, the or each said first groove having a plurality of said depression acting as film frame locating means.

16. The camera of claim 15 wherein a said depression is formed on a second said lead groove as a film titler locating means, film titler means being provided adjacent said titler locating means, and means for releasing said film from the film carrier.

17. The camera of claim 16 wherein said depressions are formed as ramps in said grooves.

18. The camera of claim 16 wherein said depressions are formed as holes of circular cross section in said grooves.

19. The camera of claim 16 wherein said frame locating means are provided at 7.75 mm intervals along the first groove measured along the axis of rotation.

20. The camera of claim 16 wherein said frame locating means are provided at 15.50 mm intervals said first groove measured along the axis of rotation.

21. The camera of claim 16 wherein said frame locating means are provided at 5.875 mm intervals along said first groove measured along the axis of rotation.

22. The camera of claim 16 wherein said frame locating means are provided at 5 mm intervals along said first groove measured along the axis of rotation.

23. The mechanism of claim 4 wherein the said first grooves are of similar pitch and two or more said further grooves are provided as lead grooves at least at each end of one of said first grooves, said lead grooves being of the same pitch as said first grooves and the lead grooves leading with the other said first grooves via circumferential grooves.

24. The mechanism of claim 23 wherein the lead grooves are deeper than the grooves at least in a section connecting with the said circumfential grooves.

25. The mechanism of claim 23 wherein each said lead grooves leads from said one of said first grooves to a safety groove formed at each end of the positioning means as a continuous circumferential groove around the said positioning means, wherein the safety groove is the same depth as the said first grooves.

26. The mechanism of claim 9 wherein the said first grooves are of similar pitch and two or more said further grooves are provided as lead grooves at least at each end of one of said first grooves, said lead grooves being of the same pitch as said first grooves and the lead grooves leading with the other said first grooves via circumferential grooves.

27. The mechanism of claim 26 wherein the lead grooves are deeper than the grooves at least in a section connecting with the said circumferential grooves.

28. The mechanism of claim 25 wherein each said lead grooves leads from said one of said first grooves to a safety groove formed at each end of the positioning means as a continuous circumferential groove around the said positioning means, wherein the safety groove is the same depth as the said first grooves.

* * * * *